United States Patent [19]

Bonhomme

[11] Patent Number: 4,920,448

[45] Date of Patent: Apr. 24, 1990

[54] SEMICONDUCTOR-ASSISTED ULTRA-FAST CONTACT BREAKER

[75] Inventor: Henri Bonhomme, Ans, Belgium

[73] Assignee: Acec Transport S.A., Charleroi, Belgium

[21] Appl. No.: 141,225

[22] Filed: Jan. 6, 1988

[51] Int. Cl.[5] .................... H02H 3/00

[52] U.S. Cl. .................... 361/102; 361/13; 361/187

[58] Field of Search .................... 361/5, 8, 13, 87, 93, 361/102, 187; 363/85, 128, 130

[56] References Cited

U.S. PATENT DOCUMENTS

| | | | |
|---|---|---|---|
| 2,540,466 | 2/1951 | Welch | 361/13 X |
| 2,782,345 | 2/1957 | Kesselring | 361/8 |
| 3,023,291 | 2/1962 | Soles et al. | 361/8 X |
| 3,215,797 | 12/1962 | Kesselring et al. | 361/5 X |
| 3,372,288 | 8/1964 | Wigington | 361/6 X |
| 3,515,940 | 2/1968 | Hobson, Jr. | 361/6 X |
| 3,588,605 | 6/1971 | Casson | 361/13 |
| 3,646,295 | 2/1972 | Circle | 361/8 X |
| 3,723,922 | 3/1973 | Loewen | 335/68 |
| 3,737,724 | 6/1973 | Salge et al. | 361/8 |
| 3,764,944 | 10/1973 | Erven | 335/2 |
| 3,821,509 | 6/1974 | Amagami et al. | 219/10.77 |
| 3,921,038 | 11/1975 | Kernick et al. | 317/33 |
| 4,172,268 | 10/1979 | Yanabu et al. | 361/8 X |
| 4,198,668 | 4/1980 | Bergdahl et al. | 361/8 |
| 4,568,995 | 2/1986 | Mushenski | 361/13 X |
| 4,618,905 | 10/1986 | Tokuyama et al. | 361/4 |
| 4,626,951 | 12/1986 | Nagao | 361/2 X |
| 4,631,621 | 12/1986 | Howell | 361/8 X |
| 4,723,187 | 2/1988 | Howell | 361/5 X |
| 4,731,692 | 3/1988 | Dvorak et al. | 361/102 |

FOREIGN PATENT DOCUMENTS

| | | | |
|---|---|---|---|
| 885670 | 11/1971 | Canada | 363/128 |
| 0017575 | 10/1980 | European Pat. Off. . | |
| 0184566 | 6/1986 | European Pat. Off. . | |
| 1488845 | 4/1969 | Fed. Rep. of Germany . | |
| 1162870 | 4/1958 | France . | |
| 1472205 | 1/1967 | France . | |
| 2013736 | 4/1970 | France . | |
| 2166440 | 8/1973 | France . | |
| 2379151 | 11/1978 | France . | |
| 2579007 | 9/1986 | France . | |
| 319739 | 2/1957 | Switzerland . | |
| 1034716 | 6/1966 | United Kingdom . | |

*Primary Examiner*—Derek S. Jennings
*Attorney, Agent, or Firm*—Foley & Lardner, Schwartz, Jeffery, Schwaab, Mack, Blumenthal & Evans

[57] ABSTRACT

An ultra-fast contact breaker is described which includes an ultra-fast cut-off mechanism provided with a repulsion disk fitted with moving contacts (7, 7'), the said mechanism also including fixed contacts (9, 9'), to the input and output terminals (1, 3) of which there is connected an assistance circuit (10) including a capacitor (21) and a coil (23) as well as a group of semiconductors (13, 15, 17, 19), the coil (23) wholly or partly constituting the repulsion coil of the said ultra-fast mechanism, which includes at least two parallel branches (CD, EF), a first branch (CD) including two opposed diodes (13, 15) or similar in series, each directed in the non-conducting direction for the current entering the circuit, a second branch (EF) including two opposed thyristors or similar (17, 19), each directed in the conducting direction for the current entering the circuit, and the LC oscillating circuit (21, 23) which connects the common point of the two diodes (13, 15) or similar and the common point of the two thyristors (17, 19) or similar, the two thyristors (17, 19) or similar being remote controlled or controlled by a current sensor (20) which is built in and which detects the exceeding of a previously fixed triggering threshold which can be adjusted in the control electronics.

9 Claims, 3 Drawing Sheets

SEMICONDUCTOR-ASSISTED ULTRA-FAST CONTACT BREAKER

BACKGROUND OF THE INVENTION

1. Field of the Invention

This invention relates to a current limiting ultra-fast contact breaker which can be used at medium voltage and although more particularly suited to direct current electrical traction in rolling stock or in fixed equipment, can also be used in alternating current applications.

2. Description of Related Art

It is well known that DC traction networks like those in industry are becoming more and more complex and powerful. The design of cut-off devices must evolve in order to be able to cut off increasingly larger currents and to reduce the maintenance costs. A cut-off device of the new generation must be fast in order to limit the current and reduce the mechnical and thermal requirements of the entire installation as well as the wear of its contacts and of its blowing box. At present, cut-off devices in traction networks include ultra-fast mechanisms for opening the contacts and a blowing box in which the arc created is confined and cooled. These devices give rise to significant costs due to maintenance operations and the replacement of worn parts.

In the European Patent Application No. 85.870 134.5, there is a description of an ultra-fast mechanism with electromagnetic holding wherein a same component serves as both repulsion disc and moving contact bridge, with a semiconductor-controlled oscillating circuit whose coil is used as a repulsion coil in the cut-off mechanism. The described assistance circuit, connected to the terminals of the mechanism, comprises a capacitor, a coil (repulsion coil) and a thyristor, connected in series together with a diode connected in anti-parallel with the components in series. The cut-off device fitted with the assistance circuit of this type is, however, only suitable for cutting off currents passing through the said device in the given direction. FIGURE 6 of the Application 85.870 134.5 shows a similar assistance circuit intended for a bidirectional cut-off device which enables the cutting-off of current in both directions. It appears, however, that the efficiency of the cutting-off is substantially better in one direction of current flow than in the other. This is due to an asymmetry in the circuit from which it results that the second ogive of current produced by the capacitor, weaker than the first since it is already partially damped, must cut off a short-circuit current which has had an extended time in which to develop.

SUMMARY AND OBJECTS OF THE INVENTION

An object of the present invention is to provide a semiconductor assisted ultra-fast contact breaker which does not have the disadvantages of the known devices in the state of the art such as described above.

Another object of the present invention is to provide an ultra-fast contact breaker capable of cutting off a DC current with a similar efficiency in both directions.

An additional object of the present invention is to provide a particularly high-performance contact breaker which is not very costly and does not give rise to high maintenance costs.

According to the present invention, the contact breaker includes an ultra-fast cut-off mechanism provided with a moving contact bridge and with fixed contacts, to the input and output terminals of which there is connected an assistance circuit. The assistance circuit includes at least two parallel branches, a first branch including two opposed diodes in series, each directed in the non-conducting direction for the current entering the circuit, a second branch including two opposed thyristors, each directed in the conducting direction for the current entering the circuit, and an LC oscillating circuit which connects the common point of the two diodes and the common point of the two thyristors, the thyristors being remote controlled or controlled via a current sensor which is built in and which detects the exceeding of a previously fixed triggering threshold which can be adjusted in the control electronics.

It is noted that the combination of an ultra-fast cut-off mechanism with an assistance circuit of the type mentioned above making use of power electronics capable of high performance in transient conditions enables the avoidance of the appearance and development of the electric arc between the contact terminals of the contact breaker by very rapidly opposing an antagonistic voltage which can be computed, whatever the direction of the flow of the current to be cut off may be.

BRIEF DESCRIPTION OF THE DRAWINGS

Other details of the present invention will appear more clearly on reading the description given below with reference to the drawings among which.

Figure 1:
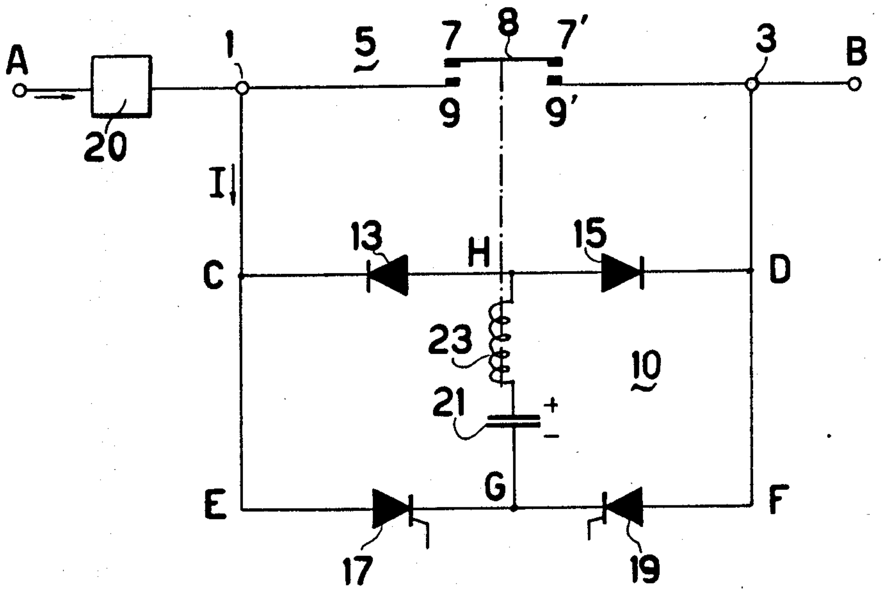
FIG. 1 is the basic diagram of the assistance circuit according to the present invention.
Figure 2:
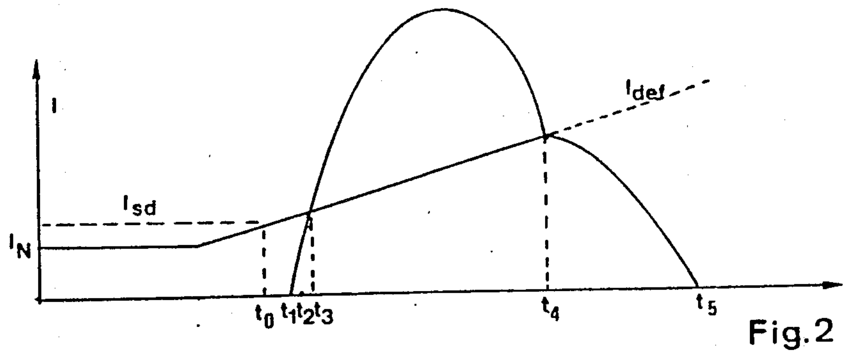
FIG. 2 illustrates the functioning of the said contact breaker.

In the figures identical references represent identical or similar components.

DESCRIPTION OF THE PREFERRED EMBODIMENTS

In the figures there have been shown the input terminals 1 and the output terminals 3 of the contact breaker 5 including a fast cut-off mechanism represented only by the moving contact bridge 7,7' and by the fixed contacts 9, 9', and an assistance circuit 10 connected in parallel with the terminals 1 and 3.

Referring to FIG. 1, the assistance circuit 10 includes two branches CD and EF connected in parallel. The branch CD includes two diodes 13 and 15 in opposition and directed in the non-conducting direction for the incoming current I. The branch EF includes two thyristors in opposition and directed in the conducting direction for the incoming current I. The two branches CD and EF are connected by an LC-type oscillating circuit comprising a capacitor 21 and a coil 23 which also serves as a repulsion coil for the repulsion disk (not shown) bearing the moving contacts bridge 7, 7'.

Let it be assumed that the device is connected to a network such that the DC current flows from A to B and is equal to its nominal value when a fault occurs.

The current increases and reaches, in $t=t_0$, the triggering threshold value $I_{sd}$ of the contact breaker.

After a delay of a few microseconds due to the electronics, at $t=t_1$ the electronics gives a firing command to the thyristor 17, as a result of the information given by the sensor 20.

A current ogive starts to form in the thyristor 17—capacitor 21—coil 23 circuit and is divided in the diode 13 (circuit HC) and in the circuit H-D-3-8 where it will be subtracted from the main current in order to rapidly bring it to zero. It is obvious that the growth of the current ogive is of an order of magnitude at least greater than that of the maximum fault current in order to produce a rapid cancellation of the current in the main contact 8.

As the inductance 23 also constitutes the repulsion coil of the ultra-fast mechanism, it causes the opening of the contact 8 about a hundred microseconds after the sending of the current ogive, at $t=t_2$.

As soon as the contact 8 is open, the fault current finds an alternative path through 1-C-E-G-H-D, while the ogive current follows the circuit E-G-H-C.

From that time onwards the voltage difference existing between the terminals A and B is equal to the difference in the forward voltage drops of the diodes 13 and 15, and therefore much lower than the minimum voltage required to have an arc at the terminals of the contact 8.

As long as the ogive current remains greater than the fault current, the situation is therefore as follows:

The contact 8 is open and continues its travel so that it can carry a significant voltage. The current in the contact 8 is eliminated at $t=t_3$ and the voltage across its terminals is almost zero. As there has been no arc at the terminals of the contact 8, the space between the terminals is not ionized and no wearing of the contacts is caused.

The current in the diode 13 is equal to the difference between the external circuit current and the ogive current.

The fault current continues to increase but it has been transferred from the contact 8 to the electronic assistance circuit.

The upstream and downstream currents, i.e. the current supplied by the source and the current in the fault are identical.

This situation will persist until $t=t_4$, the time at which the ogive current will for the second time become equal to the fault current. At this instant the topology of the circuit will be modified; the voltage at the terminals of the capacitor 21 is reversed and the capacitor becomes inserted in series with the network.

The fault current will therefore decrease, due to the apparition of this antagonistic voltage.

Given that the assistance circuit according to the present invention is substantially symmetrical, a similar reasoning can be developed when the current is flowing from B to A.

Figure 3:
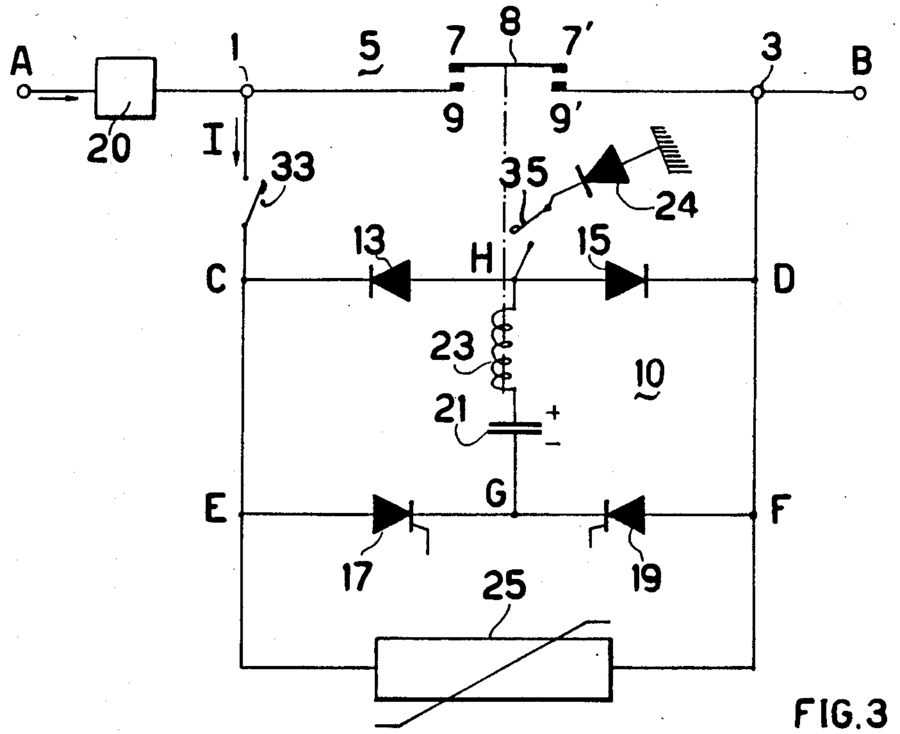
FIGS. 3 and 4 show particularly advantageous variant embodiments of the assistance circuit according to the present invention.

FIG. 3 shows an advantageous embodiment of the circuit of FIG. 1 in which there has been added a freewheeling diode 24 and a non-linear resistor 25. In effect, as soon as the fault current starts to decrease (time $t=t_4$) a dissociation of the functioning of the upstream and downstream circuits takes place.

When the current in the downstream circuit reduces, the inductance of the circuit downstream of the contact breaker biases the diodes 24 and 15 in the forward direction and it can free-wheel until it damps out with a time constant associated with the said circuit.

The current in the circuit upstream of the contact breaker reduces as the voltage at the terminals of the capacitor 21 increases. In order to limit the voltage appearing at the terminals of the device to a reasonable value when the energy stored in the inductances of the circuit upstream is large, a non-linear resistor 25 has been provided in order to dissipate this energy and to thus clip any excess voltage greater than the stated values.

Figure 4:
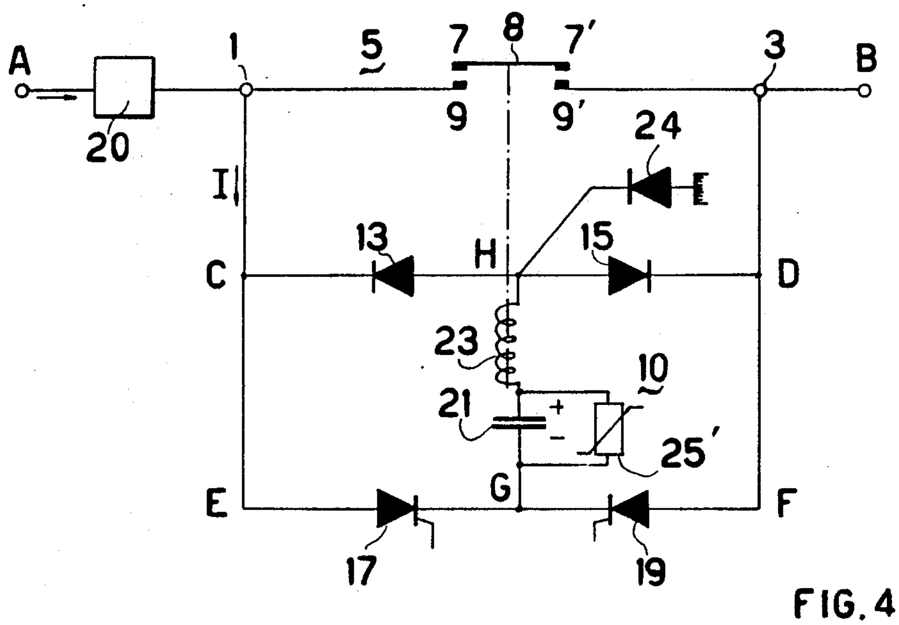

In FIG. 4 it can be seen that the said non-linear resistor 25 can also be connected in parallel with the capacitor 21. In this case, it is however continually subjected to a voltage, which can effect its lifetime.

At the instant $t=t_5$, the upstream current is eliminated and the voltage at the terminals of the device will rejoin the voltage of the network according to oscillatory conditions depending on the capacities and inductances present in the circuit.

It is further possible to provide a means of enabling galvanic isolation between the upstream and downstream circuits, which is actuated as soon as the current sensor 20 detects a zero current. Such a means can be connected in the branches 1-C and 3-D for example.

In the description of the figures it has been assumed that the electronics triggers a thyristor, namely the thyristor which closes the oscillating circuit and which is directed in the conducting direction for the main current. It is however also possible to command the two thyristors 17 and 19 simultaneously. In this case, however, it is necessary to give a different rating to the capacitor since the ogive, in this case divided by two, must always be capable of exceeding the rise in the fault current.

Figure 5:
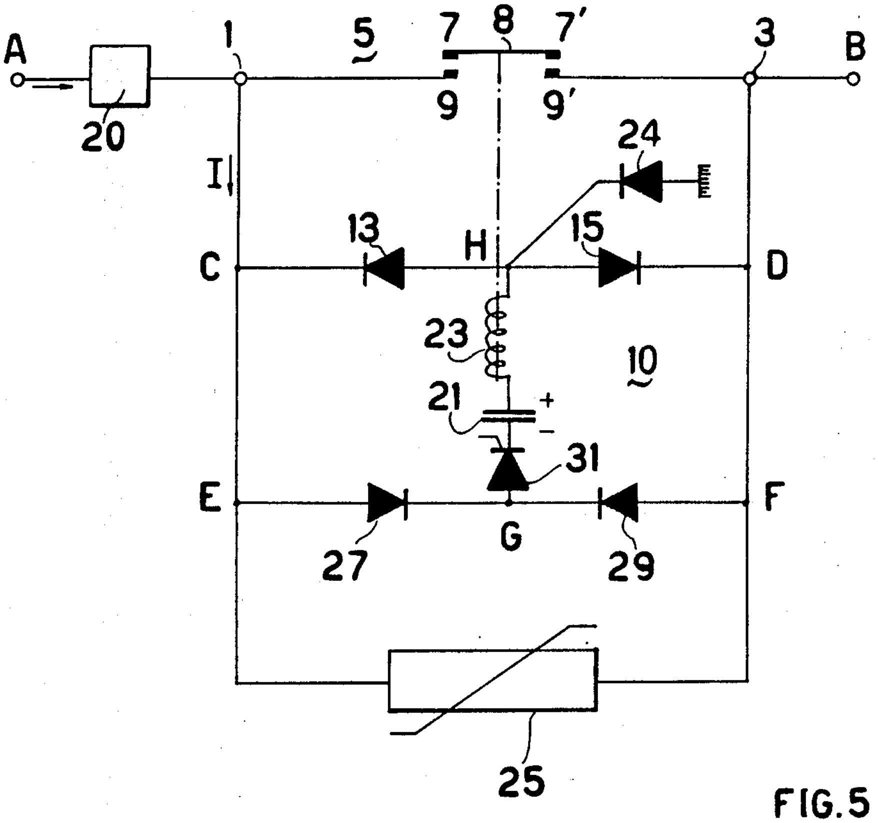
FIG. 5 shows a variance of FIG. 3 in which thyristors are replaced by diodes and other thyristors.

In the case described above, it can be advantageous to replace the two thyristors 17, 19 with two diodes 27, 29, and by a thyristor 31 connected in the branch G-H as shown in FIG. 5.

It should be noted that the contact breaker starts to act against the short circuit at the instant $t_4$, i.e. less than one millisecond after the current reaches its triggering value. The maximum value reached by the fault current is therefore of the same order of magnitude as the triggering current even in the case of very serious short-circuits.

In addition, at the time $t_4$, a voltage appears at the terminals of the contact 8, but this voltage only reaches its maximum value later, i.e. when the interelectrode distance is further increased.

In addition, the maximum value reached by the current and the speed of the cut-off are such that the $I^2t$ in the case of a serious short-circuit is several orders of magnitude lower than the value relating to conventional devices.

As there is no arc formation, there is no projection of incandescent particles, nor is there any large release of ionized gases. Because of this the isolation distances can be reduced.

The contact breaker according to the invention can cut off any current according to the same principle. It is characterized therefore by the absence of a critical current.

It is obvious that the contact breaker described above can also be used to cut off a nominal current while being remotely controlled, manually for example, instead of by a fault current reaching a triggering threshold.

The contact breaker according to the present invention is particularly suitable as a current limiter in medium voltage applications and although more particularly suited to DC electric traction in rolling stock or in fixed equipment, it can also be used in AC applications.

It can also be added that the means enabling galvanic isolation, advantageously connected in the branches 1-C and possibly 3-D or H-24 (see FIG. 3) consisting of suitable switches 33 and 35, can be used to carry out line tests either to check the state of the line using a small current before it is engaged, or for checking the state of the insulators for example.

In this latter application, there can be provided a control, known in itself, of one at least of the said switches, which enables opening and closing according to a cycle at a relatively low frequency in the order of 0.1 Hz, for the purpose of being able to work with a larger current, in the order of 5 A for example, without damaging the assistance circuit while allowing a good visual assessment of the insulators.

I claim:

1. An ultra-fast contact breaker including an ultra-fast cut-off mechanism provided with a repulsion disk fitted with moving contacts, the said mechanism also including fixed contacts, to input and output terminals of which there is connected an assistance circuit including a capacitor and a coil as well as a group of semiconductors, the coil wholly or partly constituting a repulsion coil of said ultra-fast mechanism, the assistance circuit having at least two parallel branches, a first of said branches including two opposed diodes or similar in series, each directed in a non-conducting direction for current entering the circuit, a second of said branches including two opposed thyristors or similar, each directed in a conducting direction for current entering the circuit, and an LC oscillating circuit formed by said capacitor and said coil which connects a common point of the two diodes or similar and a common point of the two thyristors or similar, the two thyristors or similar being remote controlled or controlled via a current sensor which is built in and which detects the exceeding of a previously fixed triggering threshold which can be adjusted in control electronics.

2. A contact breaker as claimed in claim 1, wherein a free-wheel diode is connected between the common point of the two opposed diodes and ground.

3. A contact breaker as claimed in claim 1, which includes a resistor, preferably a non-linear resistor, connected in parallel with the assistance circuit.

4. A contact breaker as claimed in claim 1, which includes a resistor, preferably a non-linear resistor, connected in parallel with the capacitor.

5. A contact breaker as claimed in claim 1, wherein the current sensor or the remote control actuates the thyristor directed in the conducting direction for the incoming current.

6. A contact breaker as claimed in claim 1, wherein the current sensor or the remote control actuates the two thyristors simultaneously.

7. A contact breaker as claimed in claim 1, which includes a means enabling a galvanic isolation between the circuits upstream and downstream of the said contact breaker, which is actuated as soon as the current sensor detects a zero current, the said means preferably being connected in the branches connecting the assistance circuit to the input and output terminals of the ultra-fast mechanism.

8. A contact breaker as claimed in claim 7, wherein the means enabling a galvanic isolation between the circuits upstream and downstream of the said contact breaker consist of at least one switch, one switch at least being provided with a control for opening and/or closing according to a low frequency cycle.

9. An ultra-fast contact breaker including an ultra-fast cut-off mechanism provided with a repulsion disk fitted with moving contacts, said mechanism also including fixed contacts, to input and output terminals of which there is connected an assistance circuit including a capacitor and a coil as well as a group of semiconductors, the coil wholly or partly constituting a repulsion coil of said ultra-fast mechanism, the assistance circuit having at least two parallel branches, a first of said branches including a first set of two opposed diodes or similar in series, each directed in a non-conducting direction for current entering the circuit, a second of said branches including a second set of two opposed diodes and a thyristor connected between said diodes to an LC oscillating circuit formed by said capacitor and said coil which connects a common point of the first two diodes in the first branch and a common point of the second two diodes in the second branch through said thyristor, said thyristor being remote controlled or controlled via a current sensor which is built in and which detects the exceeding of a previously fixed triggering threshold which can be adjusted in control electronics.

* * * * *